(12) United States Patent
Baldoni

(10) Patent No.: US 11,224,995 B2
(45) Date of Patent: Jan. 18, 2022

(54) EDGE MOLD

(71) Applicant: Concrete Countertop Solutions, Inc., Clarks Summit, PA (US)

(72) Inventor: Edwin Joseph Baldoni, Union Dale, PA (US)

(73) Assignee: Concrete Countertop Solutions, Inc., Clarks Summit, PA (US)

( * ) Notice: Subject to any disclaimer, the term of this patent is extended or adjusted under 35 U.S.C. 154(b) by 315 days.

(21) Appl. No.: 16/308,696

(22) PCT Filed: Jun. 21, 2017

(86) PCT No.: PCT/US2017/038490
§ 371 (c)(1),
(2) Date: Dec. 10, 2018

(87) PCT Pub. No.: WO2017/223171
PCT Pub. Date: Dec. 28, 2017

(65) Prior Publication Data
US 2020/0307031 A1  Oct. 1, 2020

Related U.S. Application Data

(60) Provisional application No. 62/353,296, filed on Jun. 22, 2016.

(51) Int. Cl.
| B29C 33/00 | (2006.01) |
| B29C 33/44 | (2006.01) |
| B29C 39/10 | (2006.01) |
| B29C 39/26 | (2006.01) |
| A47B 13/08 | (2006.01) |

(Continued)

(52) U.S. Cl.
CPC ........ *B29C 33/0011* (2013.01); *B29C 33/448* (2013.01); *B29C 39/10* (2013.01); *B29C 39/26* (2013.01); *A47B 13/08* (2013.01); *A47B 96/18* (2013.01); *E04G 5/02* (2013.01);
(Continued)

(58) Field of Classification Search
None
See application file for complete search history.

(56) References Cited

U.S. PATENT DOCUMENTS 3,708,930 A * 1/1973 Stegmeier ............... E04H 4/141
                                                               52/98
5,146,720 A    9/1992 Turner
(Continued)

OTHER PUBLICATIONS

Extended European Search Report for European Patent Application No. 17816120.4, 8 pages.
(Continued)

*Primary Examiner* — Timothy Kennedy
*Assistant Examiner* — Olukorede Esan
(74) *Attorney, Agent, or Firm* — Morgan, Lewis & Bockius LLP

(57) ABSTRACT

A method of producing an in-situ molded concrete object includes positioning a form on a substrate. The form can include a leg portion, a face portion, and a frangible portion. The frangible portion can connect the leg portion to the face portion. The method includes coupling the leg portion to the substrate to create a container open on at least one side. The method also includes pouring concrete into the container. The frangible portion can be fractured to separate the face portion from the leg portion.

17 Claims, 8 Drawing Sheets

(51) Int. Cl.
  *A47B 96/18* (2006.01)
  *E04G 5/02* (2006.01)
  *E04G 13/06* (2006.01)
  *E04H 4/00* (2006.01)

(52) U.S. Cl.
  CPC ............ *E04G 13/06* (2013.01); *E04G 13/062* (2013.01); *E04G 13/068* (2013.01); *E04H 4/0081* (2013.01)

(56) References Cited

U.S. PATENT DOCUMENTS

| | | |
|---|---|---|
| 6,260,313 B1 | 7/2001 | Stegmeier |
| 7,001,558 B2 | 2/2006 | Baldoni |
| 2004/0222550 A1* | 11/2004 | Baldoni .................. B29C 33/12 264/138 |
| 2005/0066592 A1 | 3/2005 | Huber et al. |
| 2006/0156660 A1 | 7/2006 | Stateson |
| 2013/0082160 A1 | 4/2013 | Hsiao et al. |

OTHER PUBLICATIONS

International Search Report and Written Opinion dated Sep. 28, 2017 for International Patent Application No. PCT/US17/38490.

* cited by examiner

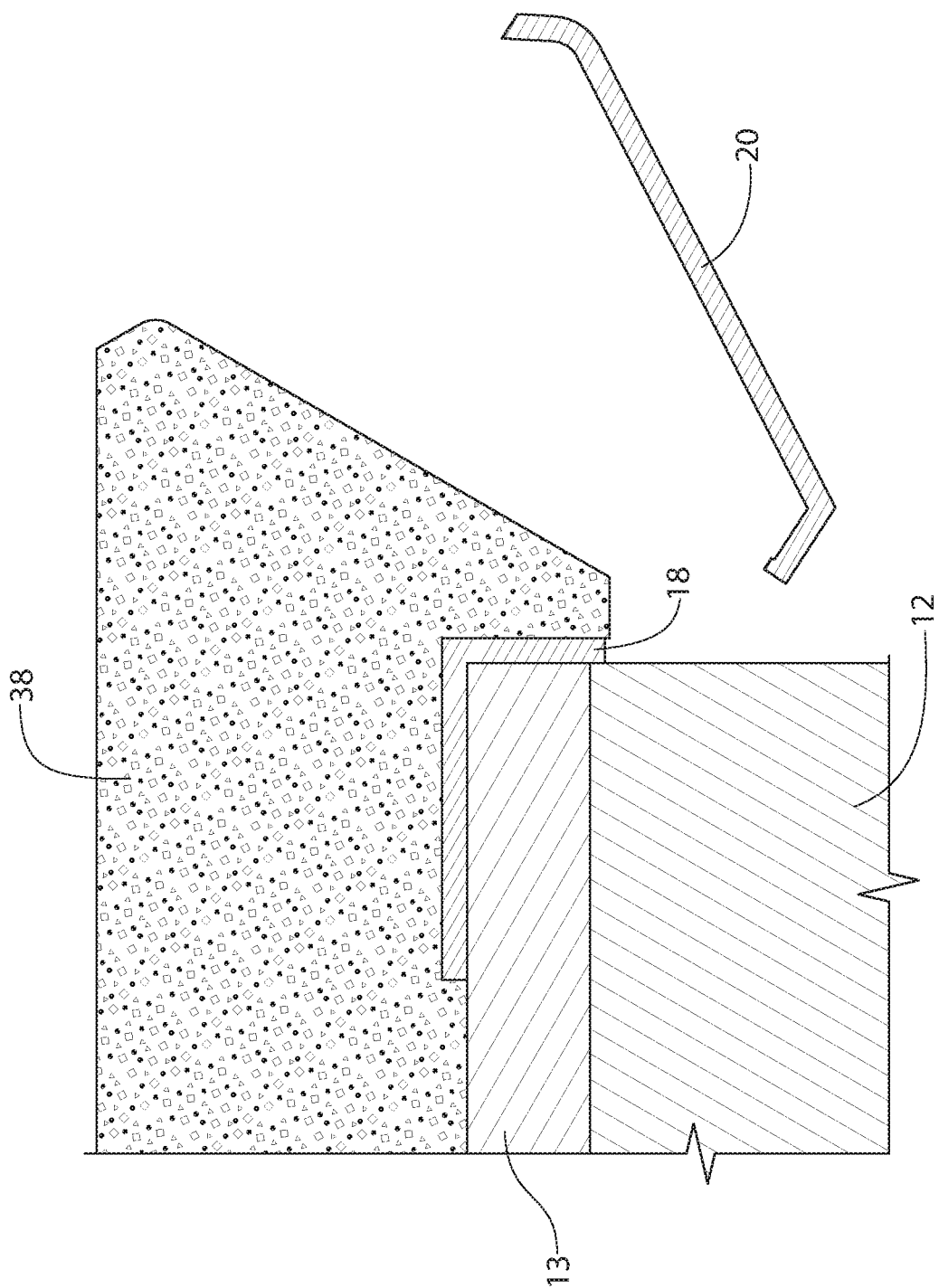

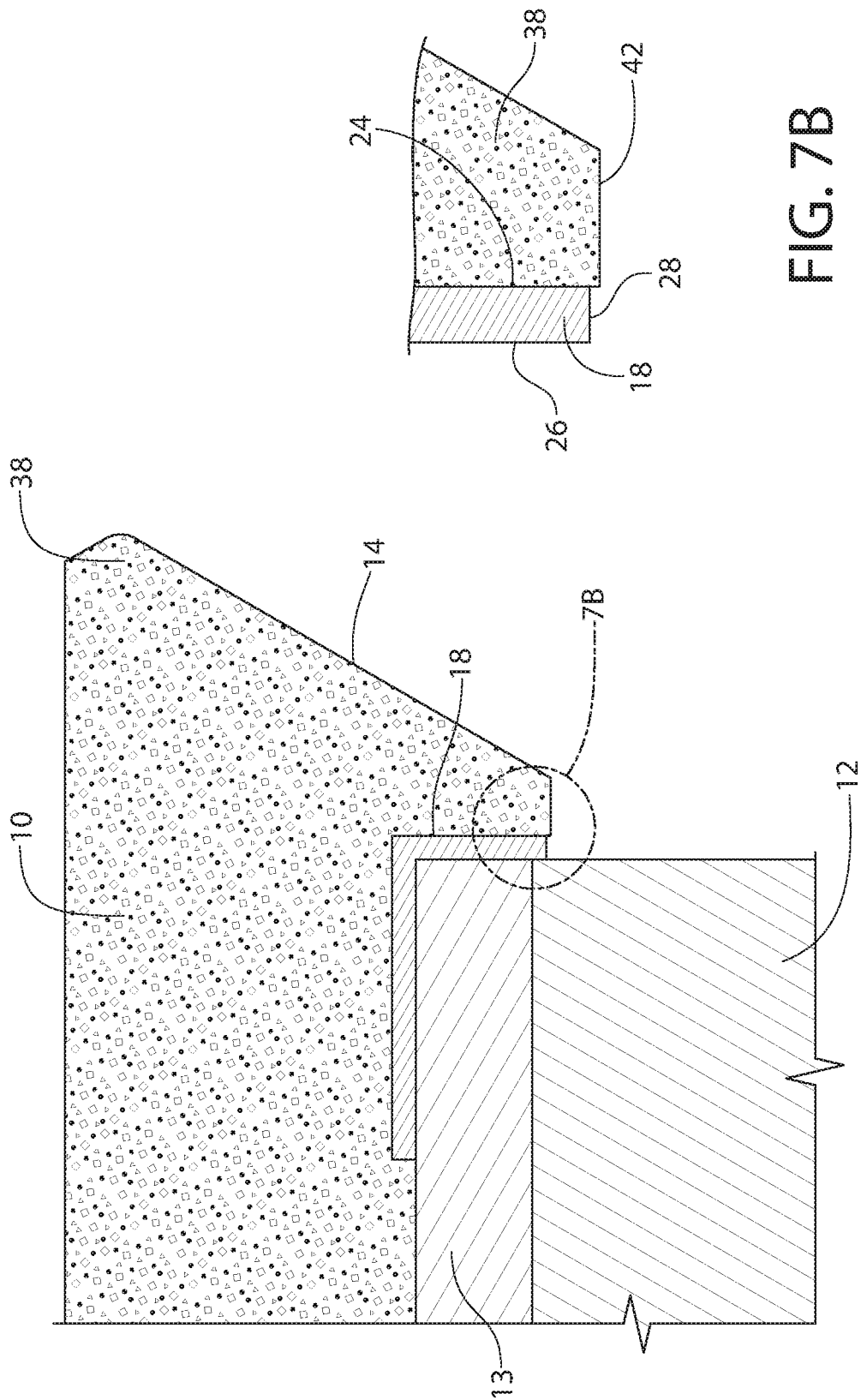

EDGE MOLD

CROSS-REFERENCE TO RELATED APPLICATIONS

This application is a U.S. National Stage of International Application No. PCT/US17/38490, filed Jun. 21, 2017, which claims the benefit of U.S. Provisional Patent Application No. 62/353,296 filed Jun. 22, 2016 entitled "Countertop Mold", each of which is hereby incorporated by reference herein its entirety.

FIELD OF THE INVENTION

The present invention generally relates to an edge mold and, in some embodiments, to an edge mold and methods for producing a molded countertop.

BACKGROUND OF THE INVENTION

Various mold assemblies are known in the art for creating custom countertops according to dimensions defined by the space needing the countertop and subsequently fixed by the size of the given mold. Many molds are popular for the production of standard sized countertops and allow for relatively high production rates. Unfortunately, most open type molds do not allow for the production of a countertop having a thickened outer edge as is desired by most consumers. The thickened edge typically is formed as a decorative, round or arc shaped contour and provides the combined advantages of comfort and safety and significantly higher aesthetic value while also hiding from view the supports which are typically attached to the underside of the countertop and by which the countertops are attached atop a cabinet.

Closed molds are also known and used and usually consist of a top half and a bottom half which are clamped or press-fit together prior to the mold being filled with an appropriate resin matrix or other type material. The closed type mold can be configured for producing a countertop with a thickened edge. The primary disadvantage of a closed mold is that it only produces a countertop according to the dimensions fixed by the size of the mold. Therefore, a differently dimensioned closed type mold is needed for producing a countertop according to each different desired specification.

Another type of prior art mold comprises an open mold constructed of a Teflon or other type of "non-stick" surface upon which is shaped a negative impression of the desired countertop. One or more of the inner facing edges of the semi-open mold is shaped as a negative of the rounded countertop edge. The procedure includes the steps of establishing an enclosed barrier which utilizes all or part of the enclosed mold by releasably securing a number of dividers in the arrangement desired. An initial pour is made to produce the top surface of the countertop. Following sufficient drying and gelling of the first pour, an appropriately configured separating bar member is secured atop the first pour in proximity to the inwardly facing edge of the mold and a second resin pour is then applied between the separating bar and the configured inner mold edge to create the thickened edge.

The above described "two-pour" process is an improvement over more traditional utilization of open type molds for creating a countertop product in that it can create a product according to more than one fixed set of dimensions. The major drawback, however, is the amount of time and effort which must be employed in measuring and setting up the mold, including installing the barriers and waiting for the first pour to sufficiently harden to permit the separating member to be attached for the final pour to create the thickened edge. Also, another disadvantage of this type of mold procedure is the low quality of the created product due to uneven thickness and lack of ability to produce straight and evenly consistent thickness of the countertop.

Still yet another challenge with many known molds is that they are not easy to use on site. That is to say, many molds are used in a shop, away from the site at which the countertop will be placed, because of the complexity with moving them and using them on site. Still other molds are designed to be used on site, but are typically arduous to set up and use.

Thus, an improved countertop mold system is desired that would be easy to use, allow for quick set-up, pouring, and disassembly, and could be easily used on site, such as in the kitchen of a house being built or remodeled.

BRIEF SUMMARY OF THE INVENTION

In one embodiment there is a method of in-situ producing a molded concrete object comprising positioning a form on a substrate, the form including a leg portion, a face portion, and a frangible portion, the frangible portion connecting the leg portion to the face portion; coupling the leg portion to the substrate to create a container open on at least one side; pouring concrete into the container; and fracturing the frangible portion to separate the face portion from the leg portion. In one embodiment, the concrete object has a top, a bottom, and at least one side, and the positioning step includes positioning the face portion to create a boundary for the at least one side. The frangible section may comprise a different material than the leg portion and the face portion. The leg portion can have a leg thickness, the face portion can have a face thickness, and the frangible portion may have a frangible thickness less than the leg thickness and the face thickness. The fracturing step may include applying a force to the face portion sufficient to fracture the frangible portion but insufficient to fracture the leg portion and the face portion. In one embodiment, the fracturing step is performed manually. In one embodiment, the fracturing step separates the face portion from the leg portion such that the leg portion remains under the molded concrete. The concrete object can have a bottom and the fracturing step may result in a lower surface of the leg portion being flush with or below the bottom. The concrete object may have a bottom and the fracturing step may result in a lower surface of the leg portion being above the bottom. In a further embodiment, the method includes vibrating the form prior to fracturing the frangible portion. In a further embodiment, the method includes vibrating the concrete prior to fracturing the frangible portion. The frangible portion may be included in the form prior to the coupling step.

In one embodiment, there is a form for in-situ production of a molded object comprising a leg portion configured to attach to a substrate; a face portion detachably coupled to and extending away from the leg portion; and a frangible portion coupling the leg portion to the face portion, the frangible portion configured to fracture when the face portion is detached from the leg portion. In one embodiment, the leg portion has a leg thickness, the face portion has a face thickness, and the frangible portion has a frangible thickness, the frangible thickness less than the leg thickness and the face thickness. In one embodiment, the frangible portion comprises a different material than the leg portion and the face portion. In another embodiment the face portion includes an upper face surface, a lower face surface, and a side face surface, wherein the leg portion includes a front leg surface, a back leg surface, and a bottom leg surface, and wherein the side surface is positioned between a plane defined by the front leg surface and a plane defined by the back leg surface. The upper face surface may be connected to the bottom leg surface by the frangible portion. The bottom leg surface may be between a plane defined by the upper face surface and a plane defined by the lower face surface.

In one embodiment, a method of in-situ producing a molded object comprises installing a form including a leg portion and a contoured face portion with a frangible section forming a frangible score line connecting the leg portion to the contoured face portion; inserting a material having a flowable state and a solid state; allowing the material to cure from the flowable state to the solid state; applying a force to the contoured face portion to fracture the form along the frangible score line and separating the contoured face portion from the leg portion. In one embodiment, the material comprises at least one of concrete, cement, and asphalt and the time required for allowing the material to cure is dependent upon the material. The frangible score line may be included in the form prior to installing the form.

In another embodiment, a method of in-situ producing a molded concrete object comprises positioning a form on a substrate, the form including a leg portion, a face portion, and a frangible portion, the frangible portion connecting the leg portion to the face portion, the frangible portion being included on the form prior to positioning the form on the substrate; coupling the leg portion to the substrate to create a container open on at least one side; pouring concrete into the container; vibrating at least one of the form and the concrete; allowing the concrete to cure; manually applying a force to the face portion, thereby fracturing the frangible portion; and removing the face portion from the leg portion such that a lower surface of the leg portion is flush with or above a bottom surface of the concrete.

In another embodiment, a form for in-situ production of a molded object comprises a leg portion configured to attach to a substrate, the leg portion including a front leg surface, a back leg surface, a bottom leg surface, and a leg thickness; a face portion detachably coupled to and extending away from the leg portion, the face portion including a side face surface, an upper face surface, a lower face surface, and a face thickness; and a frangible portion having a frangible thickness less than the leg thickness and the face thickness, the frangible portion coupling the leg portion to the face portion and configured to fracture when the face portion is detached from the leg portion; wherein the side face surface is positioned between a plane defined by the front leg surface and a plane defined by the back leg surface and the bottom leg surface is between a plane defined by upper face surface and a plane defined by the lower face surface.

BRIEF DESCRIPTION OF THE SEVERAL VIEWS OF THE DRAWINGS

The foregoing summary, as well as the following detailed description of embodiments of the device and method, will be better understood when read in conjunction with the appended drawings of exemplary embodiments. It should be understood, however, that the invention is not limited to the precise arrangements and instrumentalities shown.

In the drawings:

FIG. 6 is a side view of the form of FIG. 2 attached to a substrate with concrete on the form and substrate with a portion of the form detached;

FIG. 7A is a side view of the form of FIG. 2 attached to a substrate with concrete on the form and substrate with a portion of the form detached;

FIG. 7B is an enlarged side view of the form of FIG. 2 and concrete with a portion of the form detached.

DETAILED DESCRIPTION OF THE INVENTION

Figure 1:
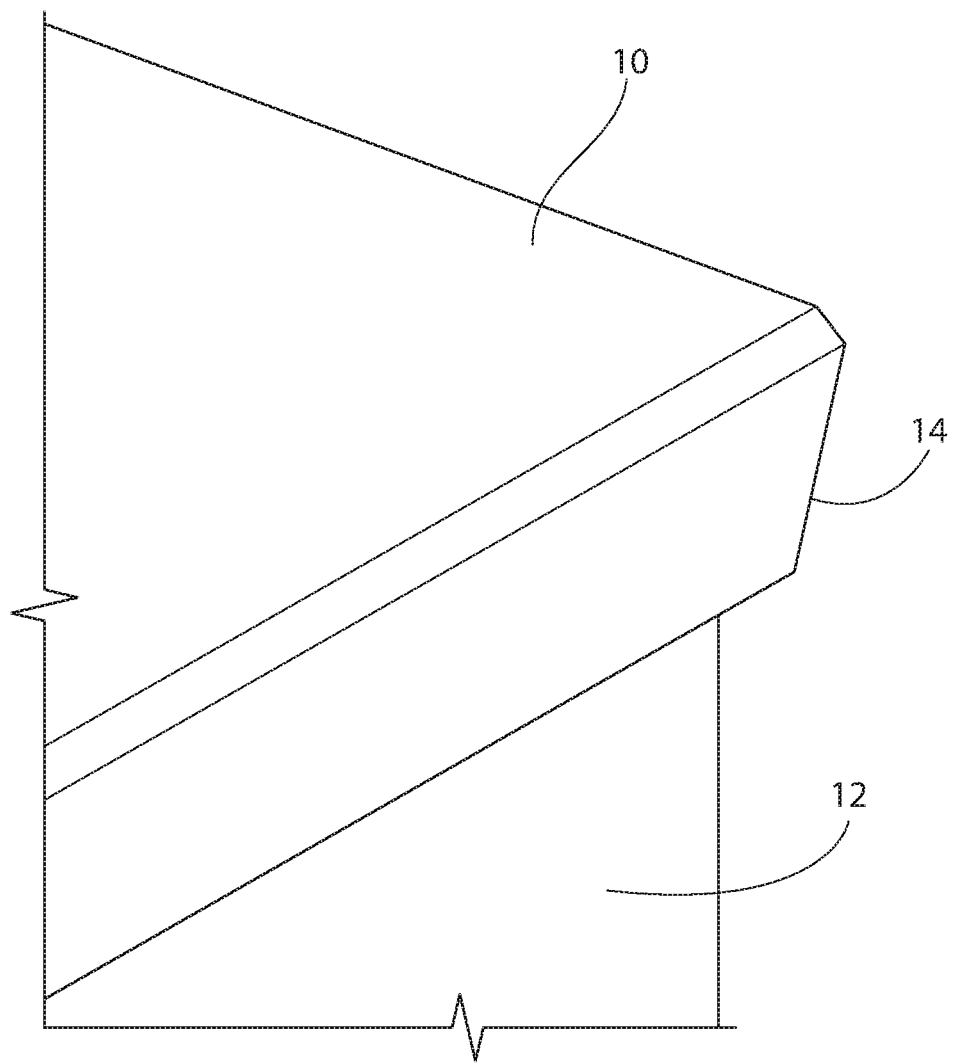
FIG. 1 is a top perspective view of a concrete countertop created using a form in accordance with a first exemplary embodiment of the present invention.

Referring to the drawings in detail, wherein like reference numerals indicate like elements throughout, there is shown in the drawings, a form, generally designated 16, in accordance with exemplary embodiments of the present invention. Various embodiments of the form 16 and method of use are described in further detail below in reference to the exemplary embodiments shown in the figures.

The form 16 may be used to create on site, or in-situ, a countertop or any other molded object having an edge (e.g., window sills, tables, stairs, patios, pools). FIG. 1, for example, shows a molded countertop 10 on top of a substrate 12. The countertop 10 may have a contoured side edge or face 14. One type of form which may be attachable to a substrate 12 to produce a countertop with one type of contoured face 14 is described in U.S. Pat. No. 7,001,558, the disclosure of which is hereby incorporated by reference herein.

Figure 2:
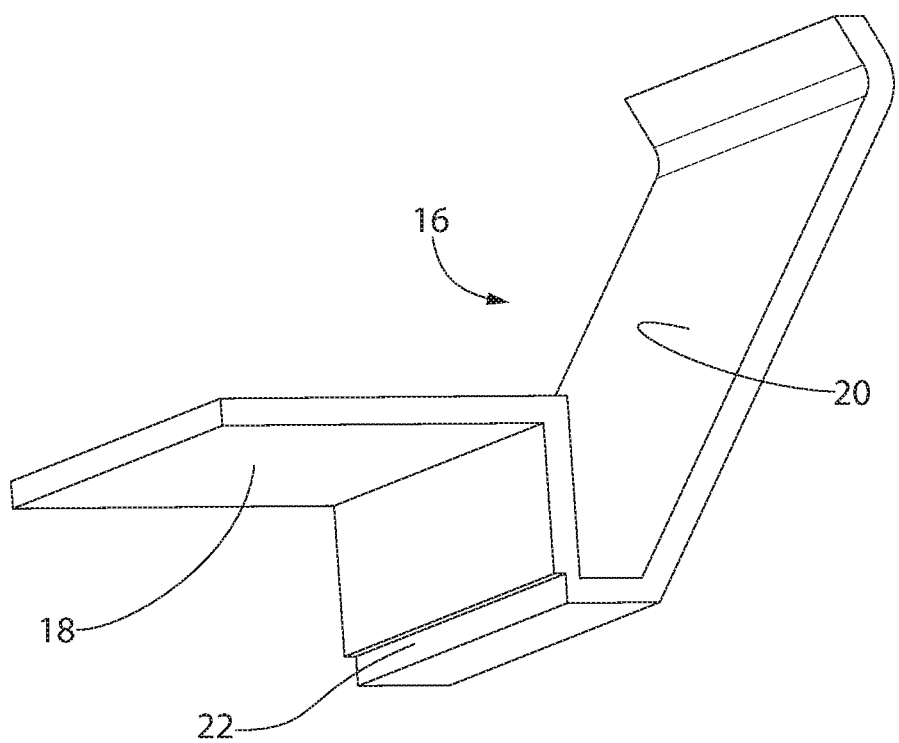
FIG. 2 is a side perspective view of a portion of a form in accordance with an exemplary embodiment of the present invention.

Referring to FIG. 2, there is shown an exemplary form 16 which may be used for in-situ production of the molded object. The form 16 may create a container that is open on at least one side and configured to receive a material (e.g., cement, concrete, asphalt, or other composite materials). The form 16 may include a leg 18, or leg portion, configured to attach to the substrate 12. In one embodiment, the leg 18 is generally planar and configured to mate with a top surface of the substrate 12 (see FIG. 3). In one embodiment, the leg 18 is bent at a right angle and configured to mate with a front surface of the substrate 12. A face 20, or face portion, may extend away from the leg 18. The face 20 and leg 18 may be detachably coupled to each other by a frangible portion 22. The frangible portion 22 may fracture when the face 20 is detached from the leg 18, as described in greater detail below. The frangible portion 22 may extend the length of the form 16 or may be formed intermittently along the length of the form 16. In one embodiment, the leg 18 extends only vertically to attach only to a vertical surface of the substrate 12 rather than extend over a horizontal surface of the substrate 12. In one embodiment, the form is integrally formed with the substrate 12.

Figure 3:
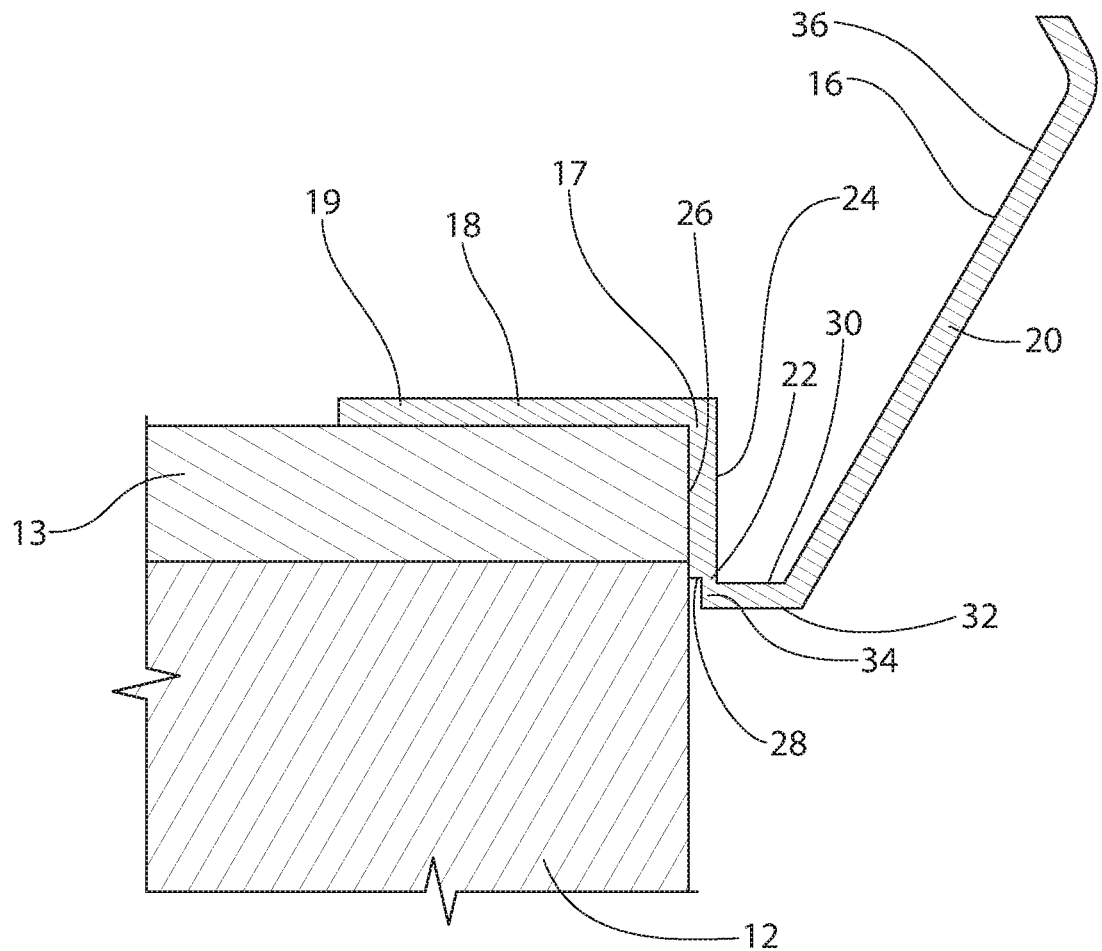
FIG. 3 is a side view of the form of FIG. 2 attached to a substrate.

Referring to FIG. 3, the leg 18 may have a front leg surface 24, a back leg surface 26, and a bottom leg surface 28. The leg 18 may have a leg thickness as measured between the front leg surface 24 and the back leg surface 26. The leg 18 may have a first portion 17 transverse to a second portion 19 such that the leg 18 can be positioned adjacent more than one side of the substrate 12. The face 20 may have an upper face surface 30, a lower face surface 32, and a side face surface 34. The face 20 may have a face thickness as measured between the upper face surface 30 and lower face surface 32. The face 20 may have an inner surface 36 which is a negative mold of the desired contoured face 14 of the finished countertop 10. In one embodiment, the leg 18 and face 20 are coupled to each other by the frangible portion 22 such that the side face surface 34 is positioned between a plane defined by the front leg surface 24 and a plane defined by the back leg surface 26. In other embodiments, the side face surface 34 is within a plane defined by one of the front leg surface 24 and the back leg surface 26. In yet another embodiment, the side face surface 34 is positioned outside of the space between a plane defined the front leg surface 24 and a plane defined by the back leg surface 26. The upper face surface 30 may be spaced from the bottom leg surface 28. In other words, a plane defined by the upper face surface 30 may be spaced from a plane defined by the bottom leg surface 28 while the leg 18 is attached to the face 20. In one embodiment, the upper face surface 30 and bottom leg surface 28 are parallel to each other. The upper face surface 30 and the bottom leg surface 28 may be connected to each other by the frangible portion 22. Thus, even if the upper face surface 30 and bottom leg surface 28 are spaced from each other they are still coupled to each other such that the form has a continuous inner surface. The bottom leg surface 28 may be between a plane defined by the upper face surface 30 and a plane defined by the lower face surface 32. The upper face surface 30 may be between the planes defined by the bottom leg surface 28 and the lower face surface 32. The frangible portion 22 may be along the bottom leg surface 28 above the lowest point of the form.

Still referring to FIG. 3, the frangible portion 22 may have a frangible portion vertical thickness measured as the space between the bottom leg surface 28 and the upper face surface 30. In one embodiment, the frangible portion vertical thickness is between about 0.001 and 0.1 inches. In another embodiment, the frangible portion vertical thickness is between about 0.005 and 0.01 inches. In another embodiment, the frangible portion vertical thickness is about 0.008 inches. The frangible portion 22 may have a frangible portion horizontal thickness measured as the space between the side face surface 34 and the front leg surface 24. In one embodiment, the frangible portion horizontal thickness is between about 0.01 and 1 inch. In another embodiment, the frangible portion horizontal thickness is between about 0.05 and 0.1 inches. In another embodiment, the frangible portion horizontal thickness is about 0.06 inches. In one embodiment, at least one of the frangible portion horizontal and vertical thicknesses are less than the leg thickness and the face thickness. In another embodiment, at least one of the frangible portion horizontal and vertical thicknesses are equal to or greater than at least one of the leg thickness and the face thickness. In one embodiment, at least one of the frangible portion horizontal and vertical thicknesses are consistent along the length of the form 16. In other embodiments, at least one of the frangible portion horizontal and vertical thicknesses may have one or more recesses or perforations such that at least one of the thicknesses vary. The frangible portion 22 may comprise a different material than the leg 18 and the face 20. For example, the frangible portion 22 may be comprised of plastic while the leg 18 and face 20 may be comprised of metal or a different type of plastic. In one embodiment, the frangible portion 22 may be a horizontal line. In another embodiment, the frangible portion 22 has a shape other than straight (e.g. undulating, angled). In other embodiments, the frangible portion 22 may be a notch (e.g., a notch with 90° edges), indented from the back leg surface 26, and/or one or more perforations in the back leg surface 26. In one embodiment, the frangible portion 22 include indentations to create a perforation effect. The form 16 may be manufactured by extraction molding or die molding. In one embodiment, the frangible portion 22 is formed during the molding or extruding process. In another embodiment, the frangible portion 22 is formed after molding of the form 16.

Still referring to FIG. 3, a method of producing an in-situ molded object can include positioning the form 16 on the substrate 12. The form 16 may be the form 16 previously described which includes the leg 18, the face 20, and the frangible portion 22. The frangible portion 22 may be included in the form 16 prior to the form 16 being positioned on the substrate 12. The leg 18 may be coupled to the substrate 10 via adhesive, screws, nails, etc. to create a container open on at least one side. The substrate 12 may be a cabinet, vanity, or other type of structure. An intermediate substrate 13 (e.g. cement board, fiberboard, plywood) may be placed on the substrate 12 onto which material is placed as explained in greater detail below. In one embodiment, the intermediate substrate 13 is waterproof or water resistant to prevent moisture from the material from contacting the substrate 12. In one embodiment, the intermediate substrate 13 provides a uniform, rigid underlayment for the countertop.

Figure 4:
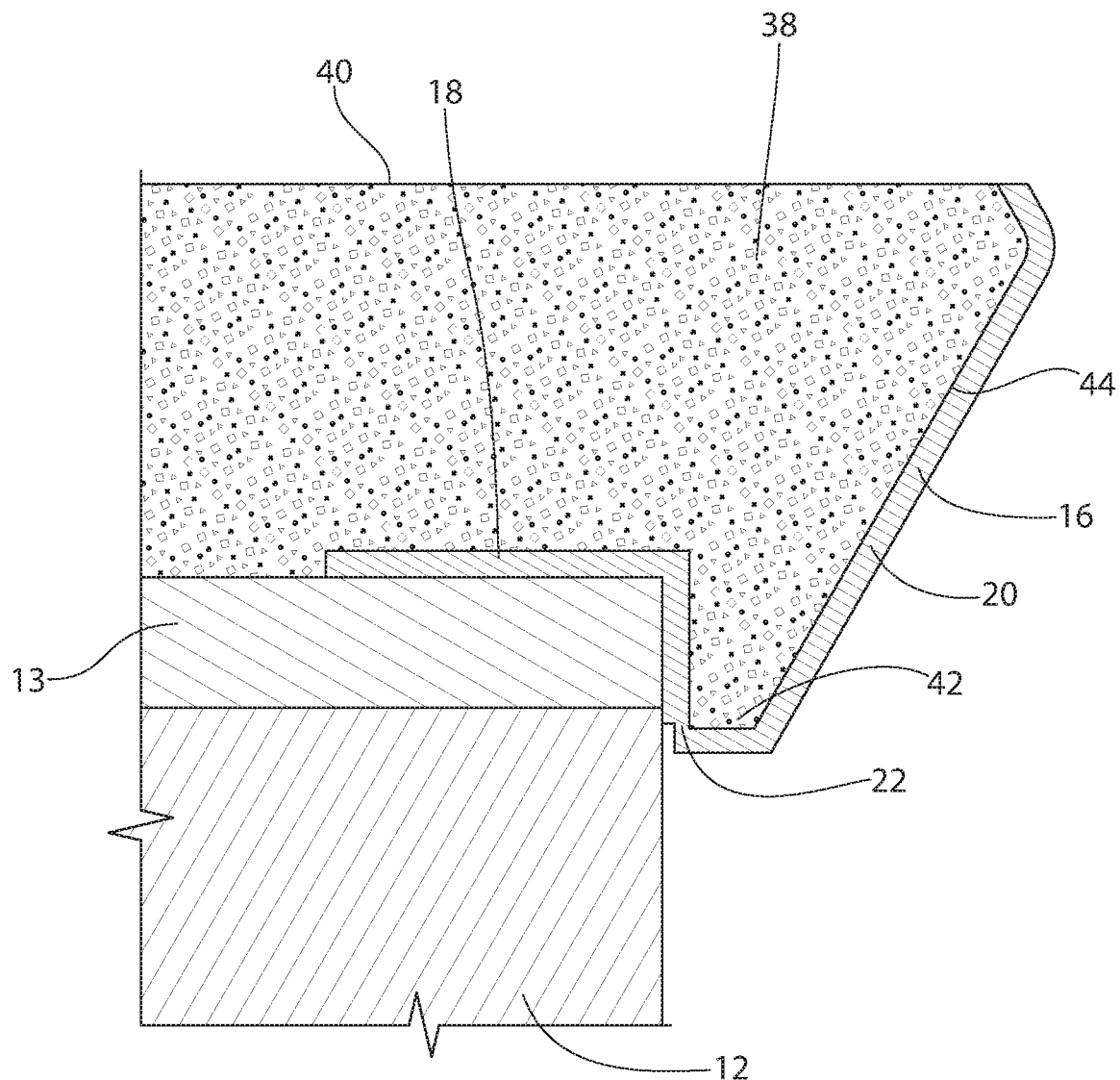
FIG. 4 is a side view of the form of FIG. 2 attached to a substrate with concrete on the form and substrate.

Referring to FIG. 4, a material 38 (e.g. cement, asphalt, concrete) may be poured into the open container created by the form 16 such that the material 38 is on top of the substrate 12 and leg 18, and adjacent the face 20. The material 38 may have a top 40, a bottom 42, and at least one side 44. In one embodiment, the bottom 42 is positioned below a plane defined by the top surface of intermediate substrate 13 and/or substrate 12. In some embodiments, bottom 42 may be positioned below a plane defined by the bottom leg surface 28. The bottom 42 may be positioned within a concavity defined by front leg surface 24, upper face surface 30, and back leg surface 26. The form 16 may positioned such that the face 20 creates a boundary for the side 44. The material 38 may have a flowable state that allows it to be poured into the container. The material 38 may be curable to transition to a solid state. The time required for the material 38 to cure may be dependent upon the selected material. In one embodiment, the form 16 is vibrated after the material 38 is poured into the container and before the frangible portion 22 is fractured. In another embodiment, a vibrator is inserted into the material 38 to vibrate the material after it is poured into the container and before the frangible portion 22 is fractured. Vibrating the material may enhance the flow of the material such that the material fills any voids within the open container.

Figure 5:
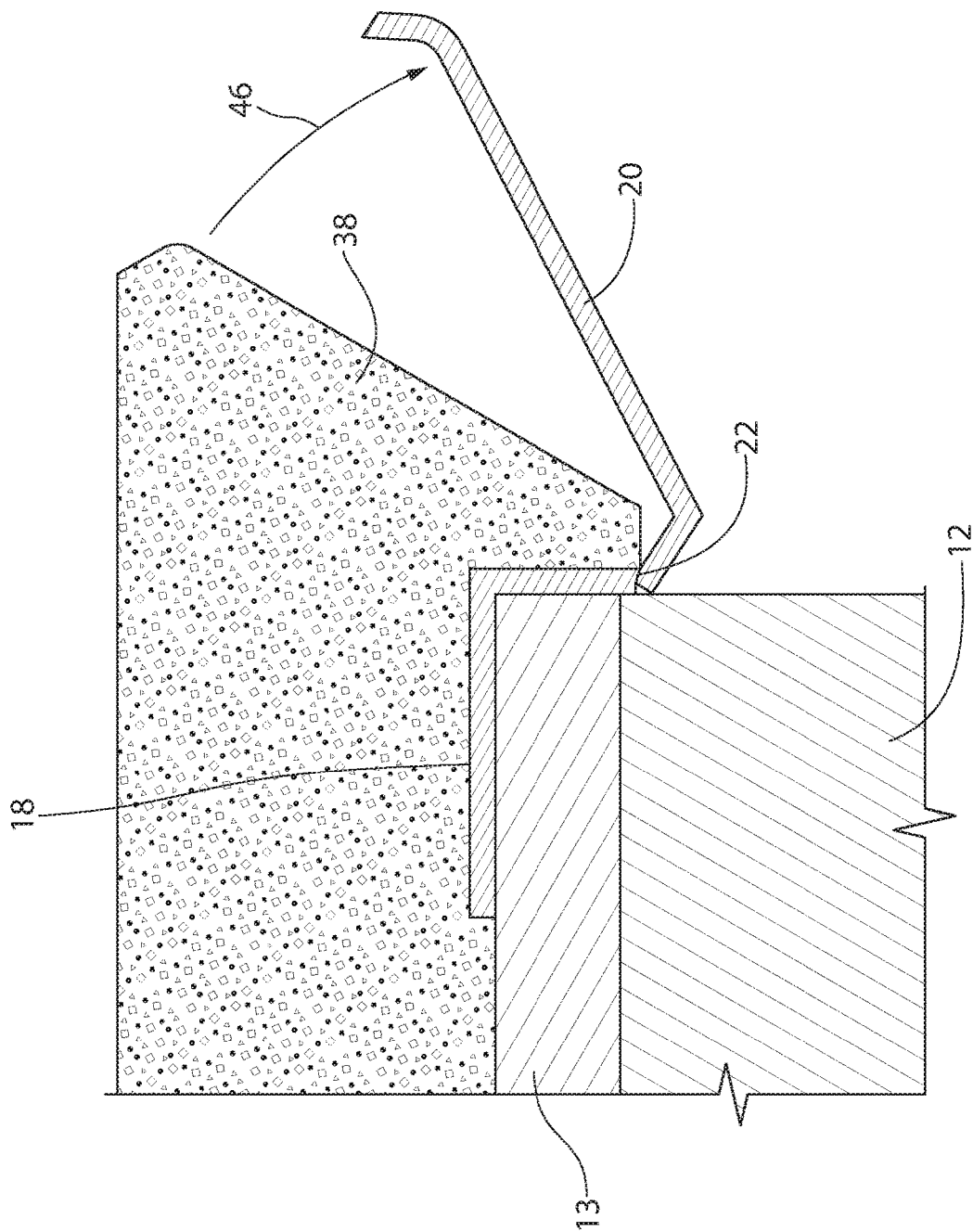
FIG. 5 is a side view of the form of FIG. 2 attached to a substrate with concrete on the form and substrate with a portion of the form rotated.
Figure 8A:
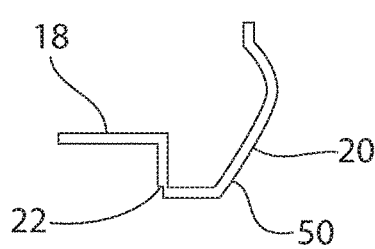
FIGS. 8A-8G are side views of various form shapes in accordance with exemplary embodiments of the present invention.
Figure 8B:
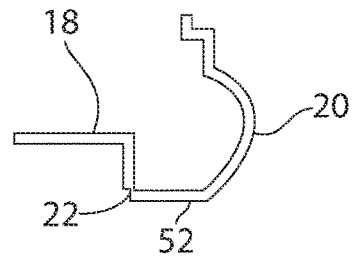
Figure 8C:
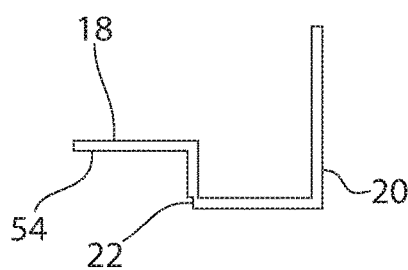
Figure 8D:
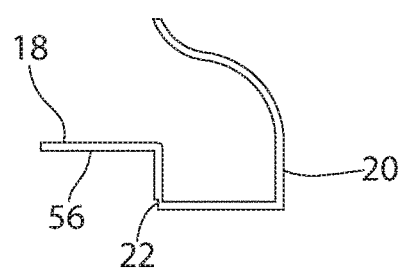
Figure 8E:
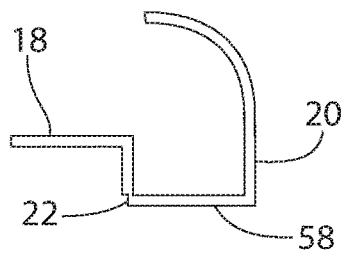
Figure 8F:
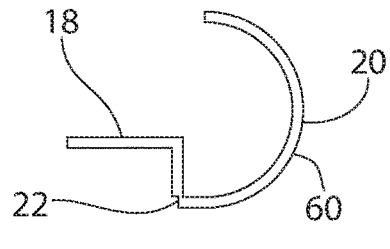
Figure 8G:
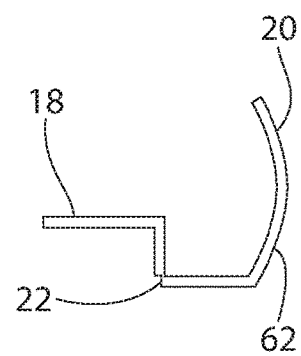

Referring to FIG. 5, the face 20 may be separated from the material 38 after the material has cured or substantially cured. Once the material 38 is sufficiently cured, a force 46 may be applied to the face 20 to separate the face 20 from the material 38. The face 20 may rotate about the frangible portion 22 as the force 46 is applied. The indent forming the frangible portion 22 may compress as the face 20 is rotated until the frangible portion fractures. The frangible portion 22 may fracture as the force 46 is applied. In one embodiment, a user applies the force 46 manually (e.g., pulling) to fracture the frangible portion 22. In another embodiment, a user applies the force 46 with a tool. In one embodiment, the force 46 is sufficient to fracture the frangible portion 22 but insufficient to fracture the leg 18 or the face 20. In other embodiments, the force 46 is sufficient to fracture any of the leg 18, face 20, and frangible portion 22, but the lower strength of the frangible portion 22 causes it to fracture first. The force 46 may be greater than a force exerted by the material 38 on the face 20. In one embodiment, the force 46 is applied downwardly and away from the material 38. In one embodiment, the force required to fracture the form 16 with the frangible portion 22 may be about 10%, about 20%, about 30%, about 40%, about 50%, about 60%, about 70%, about 80%, or about 90% of the force required to fracture a similar form which does not include a frangible portion. In one embodiment, the frangible portion 22 fractures when face 20 begins to separate from the material 38. In another embodiment, the frangible portion 22 fractures when the face 20 is rotated a certain amount (e.g. about 5°, about 10°, about 15°, about 20°, about) 25°.

Referring to FIG. 6, fracturing the frangible portion 22 may separate the face 20 from the leg 18. The leg 18 may remain under the material 38 after it is separated from the face 20. The face 20 may be discarded after it is separated from the leg 18.

Referring to FIG. 7A, the material 38 may have a contoured face 14 after it is cured which is a negative impression of the inner face surface 36 of the face 20. The countertop 10 may be subject to after treatments (e.g. sanding, staining, painting, sealing) after the face 20 is removed from the material 38.

Referring to FIG. 7B, the bottom leg surface 28 may be above the bottom 42 of the material 38 after the face 20 is removed. In other words, the leg 18 may not be visible to an observer viewing the countertop 10 after the face 20 is detached from the leg 18. Such a configuration may be more aesthetically pleasing as only the finished countertop 10 would be visible. The bottom leg surface 28 may also extend beyond the intermediate substrate 13. This configuration may conceal the intermediate substrate 13 as well as the leg 18 of the form 16 such that only the substrate 12 and the countertop 10 are visible when the installation is complete. Including the frangible portion 22 in the form 16 prior to attaching it to a substrate may allow the leg 18 to be concealed after it is detached from the face 20. Attempting to create a frangible portion (e.g. by scoring with a blade) above the bottom 42 after the material 38 is cured would be difficult, if not impossible, because the countertop 10 obstructs access to the leg 18. Furthermore, using a blade to score the leg 18 may make creating a uniform bottom leg surface 28 difficult, in contrast to the present invention. In some embodiments, the bottom leg surface 28 is flush with or below the bottom 42 of the material 38 after the face 20 is removed. In some embodiments, the bottom leg surface 28 and bottom 42 are parallel after the face 20 is separated from the leg 18.

Referring to FIGS. 8A-8G, several additional exemplary embodiments of the form, generally designated 50, 52, 54, 56, 58, 60, and 62, respectively, are shown. The forms are similar to the form 16 but include a differently shaped face 20. The face 20 of the additional exemplary embodiments may provide a countertop 10 with a contoured face 14 following the shape of the form 50, 52, 54, 56, 58, 60, and 62. The form 50, 52, 54, 56, 58, 60, and 62 may be operated in the same way wherein the frangible portion 22 is included in the form 50, 52, 54, 56, 58, 60, and 62 prior to attaching the form 50, 52, 54, 56, 58, 60, and 62 to the substrate. The frangible portion 22 may be fractured while simultaneously separating the face 20 from the leg 18.

It will be appreciated by those skilled in the art that changes could be made to the exemplary embodiments shown and described above without departing from the broad inventive concepts thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and various features of the disclosed embodiments may be combined. The words "right", "left", "lower" and "upper" designate directions in the drawings to which reference is made. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the methods of the present invention do not rely on the particular order of steps set forth herein, the particular order of the steps should not be construed as limitation on the claims. Any claims directed to the methods of the present invention should not be limited to the performance of their steps in the order written, and one skilled in the art can readily appreciate that the steps may be varied and still remain within the spirit and scope of the present invention.

I claim:

1. A method of in-situ producing a molded object, comprising:
    positioning a form on a substrate, the form including a leg portion, a face portion, and a frangible portion, the frangible portion connecting the leg portion to the face portion;
    coupling the leg portion to the substrate to create a container open on at least one side;
    pouring material into the container; and
    rotating the face portion about the frangible portion, thereby fracturing the frangible portion to separate the face portion from the leg portion.

2. The method of claim 1, wherein the molded object has a top, a bottom, and at least one side, and the positioning step includes positioning the face portion to create a boundary for the at least one side.

3. The method of claim 1, wherein the frangible portion comprises a different material than the leg portion and the face portion.

4. The method of claim 1, wherein the leg portion has a leg thickness, the face portion has a face thickness, and the frangible portion has a frangible thickness, the frangible thickness being less than the leg thickness and the face thickness.

5. The method of claim 1, wherein the fracturing step includes applying a force to the face portion sufficient to fracture the frangible portion but insufficient to fracture the leg portion and the face portion.

6. The method of claim 1, wherein the fracturing step is performed manually.

7. The method of claim 1, wherein the fracturing step separates the face portion from the leg portion such that the leg portion remains under the molded object.

8. The method of claim 1, wherein the molded object has a bottom and the fracturing step results in a lower surface of the leg portion being flush with or below the bottom.

9. The method of claim 1, wherein the molded object has a bottom and the fracturing step results in a lower surface of the leg portion being above the bottom.

10. The method of claim 1 further comprising:
vibrating the form prior to fracturing the frangible portion.

11. The method of claim 1 further comprising:
vibrating the material prior to fracturing the frangible portion.

12. The method of claim 1, wherein the frangible portion is included in the form prior to the coupling step.

13. A method of in-situ producing a molded object, comprising:
installing a form on a substrate to create a container open on at least one side, the form including a leg portion and a contoured face portion with a frangible section forming a frangible score line connecting the leg portion to the contoured face portion, the frangible section included in the form prior to installing the form;
inserting a material into the container in contact with the leg portion and the contoured face portion, the material having a flowable state and a solid state;
allowing the material to cure from the flowable state to the solid state;
applying a force to the contoured face portion to rotate the face portion about the frangible portion to fracture the form along the frangible score line; and
separating the contoured face portion from the leg portion such that a lower surface of the leg portion is flush with or above a bottom surface of the material.

14. The method of claim 13, wherein the material comprises at least one of concrete, cement, and asphalt and the time required for the allowing the material to cure from the flowable state to the solid state is dependent upon the material.

15. The method of claim 13 further comprising:
vibrating at least one of the form and the material.

16. The method of claim 13, wherein applying the force includes manually applying a force to the face portion.

17. The method of claim 1, wherein the frangible portion has a notch shape defined by a bottom leg surface of the leg portion and a side face surface of the face portion, the side face surface being positioned between a plane defined by a back leg surface of the leg portion and a plane defined by a front leg surface of the leg portion, and
wherein the bottom leg surface is positioned above a plane defined by a top face surface of the face portion.

* * * * *